US00RE41092E

(19) United States
(12) Reissued Patent
Chu

(10) Patent Number: US RE41,092 E
(45) Date of Reissued Patent: Jan. 26, 2010

(54) DATA SECURITY METHOD AND DEVICE FOR COMPUTER MODULES

(75) Inventor: William W. Y. Chu, Los Altos, CA (US)

(73) Assignee: ACQIS Technology, Inc., Mountain View, CA (US)

(21) Appl. No.: 11/056,604

(22) Filed: Feb. 10, 2005

Related U.S. Patent Documents

Reissue of:
(64) Patent No.: 6,643,777
Issued: Nov. 4, 2003
Appl. No.: 09/312,199
Filed: May 14, 1999

(51) Int. Cl.
*H04L 9/32* (2006.01)

(52) U.S. Cl. ..... 726/2; 726/3; 726/4
(58) Field of Classification Search ..... 726/2–9, 726/16–21, 26–30; 713/189, 192–194, 182–183
See application file for complete search history.

(56) References Cited

U.S. PATENT DOCUMENTS

| | | | | |
|---|---|---|---|---|
| 3,996,585 | A | | 12/1976 | Hogan |
| 4,623,964 | A | | 11/1986 | Getz et al. |
| 4,700,362 | A | | 10/1987 | Todd et al. |
| 4,769,764 | A | | 9/1988 | Levanon |
| 4,799,258 | A | * | 1/1989 | Davies ..... 713/159 |
| 4,872,091 | A | | 10/1989 | Maniwa et al. |
| 4,890,282 | A | | 12/1989 | Lambert et al. |
| 4,918,572 | A | | 4/1990 | Tarver et al. |
| 4,939,735 | A | | 7/1990 | Fredericks et al. |
| 5,056,141 | A | | 10/1991 | Dyke |
| 5,086,499 | A | | 2/1992 | Mutone |
| 5,278,509 | A | | 1/1994 | Haynes et al. |
| 5,278,730 | A | | 1/1994 | Kikinis |
| 5,293,497 | A | | 3/1994 | Free |

(Continued)

FOREIGN PATENT DOCUMENTS

| | | |
|---|---|---|
| EP | 722138 A1 | 7/1996 |
| JP | 6-289953 | 10/1994 |
| WO | WO 92/18924 | 10/1992 |
| WO | WO 94/00097 | 1/1994 |
| WO | WO 95/13640 | 5/1995 |

OTHER PUBLICATIONS

Bernal, Carlos, product brochure entitled: "PowerSMP Series 4000", (Mar. 1998) <<http://www/winnetmag,com/Windows/Article/ArticleID/3095//3095.html, downloaded from web on Jun. 22, 2004, 2 pgs.

Cragle, Jonathan, "Density System 1100", May 1999) <<http://www.winnetmag,com/Windows/Article/ArticleID/5199/5199.html>>, downloaded from web on Jun. 21, 2004, 4 pgs.

Feldman, Jonathan, "Rack Steady: The Four Rack–Mounted Servers That Rocked Our Network", <<http://www.networkcomputing.com/shared/printArticle.jhtml?article=/910/910r3side.htm...>> Jun. 23, 2004, 3 pgs.

Fetters, Dave, "Cubix High–Density Server Leads the Way With Standout Managemant Software", (Feb. 8, 1999) <<http://www.nwc.com/shared/printArticle.jhtml?article=/1003/1003r3full.html&pub=nwc>>, downloaded from web on Jun. 23, 2004, 5 pgs.

(Continued)

*Primary Examiner*—Hosuk Song
(74) *Attorney, Agent, or Firm*—Cooley Godward Kronish LLP

(57) ABSTRACT

A security method for an attached computer module in a computer system. The security method reads a security identification number in an attached computer module and compares it to a security identification number in a console, which houses the attached computer module. Based upon a relationship between these numbers, a security status is selected. The security status determines the security level of operating the computer system.

57 Claims, 8 Drawing Sheets

U.S. PATENT DOCUMENTS 5,311,397 A 5/1994 Harshberger et al.
5,317,477 A 5/1994 Gillett
5,319,771 A 6/1994 Takeda
5,331,509 A 7/1994 Kikinis
5,355,391 A 10/1994 Horowitz et al.
5,428,806 A 6/1995 Pocrass
5,436,857 A 7/1995 Nelson et al.
5,463,742 A 10/1995 Kobayashi
5,539,616 A 7/1996 Kikinis
5,546,463 A * 8/1996 Caputo et al. ..... 713/159
5,550,710 A 8/1996 Rahamim et al.
5,550,861 A 8/1996 Chan et al.
5,578,940 A 11/1996 Dillon
5,600,800 A 2/1997 Kikinis et al.
5,606,717 A 2/1997 Farmwald et al.
5,608,608 A 3/1997 Flint et al.
5,623,637 A 4/1997 Jones et al.
5,630,057 A 5/1997 Hait
5,638,521 A 6/1997 Buchala et al.
5,640,302 A 6/1997 Kikinis
5,659,773 A 8/1997 Huynh et al.
5,663,661 A 9/1997 Dillon et al.
5,673,174 A 9/1997 Hamirani
5,680,126 A 10/1997 Kikinis
5,689,654 A 11/1997 Kikinis
5,721,837 A 2/1998 Kikinis
5,721,842 A 2/1998 Beasley et al.
5,745,733 A 4/1998 Robinson
5,752,080 A 5/1998 Ryan
5,774,704 A 6/1998 Williams
5,795,228 A 8/1998 Trumbull
5,809,538 A 9/1998 Pollmann
5,815,681 A 9/1998 Kikinis
5,819,050 A 10/1998 Boehling et al.
5,826,048 A 10/1998 Dempsey et al.
5,848,249 A 12/1998 Garbus
5,859,669 A 1/1999 Prentice
5,907,566 A 5/1999 Benson et al.
5,941,965 A 8/1999 Moroz
5,948,047 A 9/1999 Jenkins et al.
5,960,213 A 9/1999 Wilson
5,968,144 A 10/1999 Walker et al.
5,977,989 A 11/1999 Lee et al.
5,982,363 A 11/1999 Naiff
5,991,163 A 11/1999 Marconi et al.
5,991,844 A 11/1999 Khosrowpour
5,999,952 A 12/1999 Jenkins et al.
6,002,442 A 12/1999 Li et al.
6,011,546 A 1/2000 Bertram
6,028,643 A 2/2000 Jordan et al.
6,029,183 A 2/2000 Jenkins et al.
6,038,621 A 3/2000 Gale et al.
6,040,792 A 3/2000 Watson et al.
6,052,513 A 4/2000 MacLaren
6,069,615 A 5/2000 Abraham et al.
6,088,224 A 7/2000 Gallagher et al.
6,163,464 A 12/2000 Ishibashi et al.
6,202,169 B1 3/2001 Razzaghe-Ashrafi et al.
6,208,522 B1 3/2001 Manweiler et al.
6,216,185 B1 4/2001 Chu
6,304,895 B1 10/2001 Schneider et al.
6,311,268 B1 10/2001 Chu
6,314,522 B1 11/2001 Chu et al.
6,317,329 B1 11/2001 Dowdy et al.
6,321,335 B1 11/2001 Chu
6,332,180 B1 12/2001 Kauffman et al.
6,345,330 B2 2/2002 Chu
6,366,951 B1 4/2002 Schmidt
6,378,009 B1 4/2002 Pinkston, II et al.
6,381,602 B1 4/2002 Shoroff et al.
6,393,561 B1 5/2002 Hagiwara et al.
6,401,124 B1 6/2002 Yang et al.
6,452,790 B1 9/2002 Chu et al.
6,453,344 B1 9/2002 Ellsworth
6,496,361 B2 12/2002 Kim et al.
6,549,966 B1 4/2003 Dickens et al.
6,643,777 B1 11/2003 Chu
6,718,415 B1 4/2004 Chu

OTHER PUBLICATIONS

Gardner, Michael and Null, Christopher, "A Server Condominium", <<http://www.lantimes.com/testing/98jun/806a042a.html>>, Jun. 23, 2004, 3 pgs.

Harrison, Dave, "VME in the Military: The M1A2 Main Battle Tank Upgrade Relies on COTS VME", <<http://www.dy4.com>>, (Feb. 9, 1998), pp. 1–34.

Williams, Dennis, "Consolidated Servers", (Feb. 17, 1997) <<http://www.lantimes.com/testing/97compare/pccon-sol.html>> downloaded from web on Jun. 23, 2004, 2 pgs.

Williams, Dennis, "Executive Summary: Consolidate Now", (Feb. 17, 1997) <<http://www.lantimes.com/testing/97feb/702b064a.html>> downloaded from web on Jun. 23, 2004, 2 pgs.

Williams, Dennis, Top "Scores for Useability and Openness", (Feb. 17, 1997) <<http://www.lantimes.com/testing/97feb/702b064a.html>> downloaded from web on Jun. 23, 2004, 2 pgs.

Williams, Dennis, "ChatCom Inc. Chatterbox", (Feb. 17, 1997) <<http://www.lantimes.com/testing/97feb/702b066a.html>> downloaded from web on Jun. 23, 2004, 3 pgs.

Williams, Dennis, "EVERSYS Corp. System 8000", (Feb. 17, 1997) <<http://www.lantimes.com/testing/97feb/702b070b.html>> downloaded from web on Jun. 22, 2004, 4 pgs.

Williams, Dennis, "Cubix Corp. ERS/FT II", (Feb. 17, 1997) <<http://www.lantimes.com/testing/97feb/702b068b.html>> downloaded from web on Jun. 23, 2004, 4 pgs.

Crystal Advertisement for "Rackmount Computers", (© 2000–2004) <<http://www.crystalpc.com/products/roservers.asp>>, downloaded from web on Jun. 17, 2004, 8 pgs.

Crystal Advertisement for "QuickConnect® Cable Managemant", (© 2000–2004) <<http://www.crystalpc.com/products/quickconnect.asp>> downloaded from web on Jun. 17, 2004, 4 pgs.

Cubix Product Brochure entitled, "Density System", (© 2000) <<http://64.173.211.7/support/techinfo/system/density10.htm>> downloaded from web on Jun. 22, 2004, 3 pgs.

Cubix Product Brochure entitled, "Density System, Technical Specification", (© 2000) <<http://64.173.211.7/support/techinfo/system/density/info/spec.htm>> downloaded from web on Jun. 22, 2004, 2 pgs.

Cubix Product Manual entitled, "Density System", Chapter 1–Introduction, (© 2000) <<http://64.173.211.7/support/techinfo/manuals/density/info/Chap–1.htm>> downloaded from web on Jun. 22, 2004, 5 pgs.

Cubix, "Click on the front panel that matches your system", (© 2000) <<http://64.173.211.7/support/techinfo/system/density/density.htm>> downloaded from web on Jun. 22, 2004, 1 pg.

Cubix Product Manual entitled, "Density System", Chapter 2–Installation, (© 2000) <<http://64.173.211.7/support/techinfo/manuals/density/Chap–2.htm>> downloaded from web on Jun. 22, 2004, 9 pgs.
Cubix Product Manual entitled, "Density System", Chapter 3–Operation, (© 2000) <<http://64.173.211.7/support/techinfo/manuals/density/Chap–3.htm>> downloaded from web on Jun. 22, 2004, 4 pgs.
Cubix Product Manual entitled, "Density System", Chapter 4–Maintenance and Repair, (© 2000) <<http://64.173.211.7/support/techinfo/manuals/density/Chap–4.htm>> downloaded from web on Jun. 22, 2004, 5 pgs.
Cubix, "What are Groups?", (© 2000) <<http://64.173.211.7/support/techinfo/system/density/info/groups.htm>>, downloaded from web on Jun. 22, 2004, 3 pgs.
Cubix, "SP 5200XS Series Plug–in Computers", (© 2000) <<http://64.173.211.7/support/techinfo/bc/sp5200xs/intro.htm>>, downloaded from web on Jun. 22, 2004, 2 pgs.
Cubix, "SP 5200XS Series Technical Specifications", (© 2000) <<http://64.173.211.7/support/techinfo/bc/sp5200xs/spec.htm>>, downloaded from web on Jun. 22, 2004, 2 pgs.
Cubix, "SP 5200 Series", Chapter 1–Introduction, (© 2000) <<http://64.173.211.7/support/techinfo/manuals/sp5200/chap–1.htm>>, downloaded from web on Jun. 22, 2004, 3 pgs.
Cubix, "SP 5200 Series", Chapter 2–Switches & Jumpers, (© 2000) <<http://64.173.211.7/support/techinfo/manuals/sp5200/chap–2.htm>>, downloaded from web on Jun. 22, 2004, 3 pgs.
Cubix, "SP 5200 Series", Chapter 3–Installation, (© 2000) <<http://64.173.211.7/support/techinfo/manuals/sp5200/chap–3.htm>>, downloaded from web on Jun. 22, 2004, 4 pgs.
Cubix, "SP 5200 Series", Chapter 4–Technical Reference, (© 2000) <<http://64.173.211.7/support/techinfo/manuals/sp5200/chap–4.htm>>, downloaded from web on Jun. 22, 2004, 3 pgs.
Cubix, "DP 6200 'D' Series Plug–in Computers", <<http://64.173.211.7/support/techinfo/bc/dp/6200d/intro.htm>>, downloaded from web on Jun. 22, 2004, 3 pgs.
Cubix, "Installing DP or SP Series Boards", (© 2000) <<http://64.173.211.7/support/techinfo/bc/dp6200/intro.htm>>, downloaded from web on Jun. 22, 2004, 2 pgs.
Cubix, "Powering On/Off or Resetting Plug–in Computers in an Density System", (© 2000) <<http://64.173.211.7/support/techinfo/system/density/info/power.htm>>, downloaded from web on Jun. 22, 2004, 2 pgs.
Cubix, "Multiplexing Video, Keyboard & Mouse with Multiple Density Systems", (© 2000) <<http://64.173.211.7/support/techinfo/system/density/info/vkm–mux.htm>>, downloaded from web on Jun. 22, 2004, 2 pgs.
eBay Advertisement for "Total IT Group Network Engines", <<http://cgi.ebay.com/we/eBayISAPI.dII?ViewItem&item=5706388046&sspagename+STRK%3AMDBI%3AMEBI3AIT&rd=1>>, downloaded from web on Jun. 25, 2004, 1 pg.
"Features Chart", (Feb. 1, 1997) <<http://www.lantimes.com/testing/97feb/702b072a.html>>, downloaded from web on Jun. 23, 2004, 3 pgs.
Internet Telephony Roundup, "Industrial Computers", <<http://www.tmcnet.com/articles/itmag/0499roundup.htm>>, downloaded from web on Jun. 23, 2004, 5 pgs.
Press Release: Hiawatha, Iowa, (Mar. 1, 1997) entitled "Crystal Group Products Offer Industrial PCs with Built–in Flexibility", <<http://www.crystalpc.com/news/pressreleases/prodpr.asp>>, downloaded from web on May 14, 2004, 2 pgs.
Press Release: Kanata, Ontario, Canada, (Apr. 1998) entitled "Enhanced COTS SBC from DY 4 Systems features 166MHz Pentium™ Processor" <<http://www.realtime–info.be/VPR/layout/display/pr.asp?/pr.asp?PRID=363>>, 2 pgs.
Product Brochure entitled "SVME/DM–192 Pentium® II Single Board Computer" (Jun. 1999) pp. 1–9.
Product Brochure entitled "System 8000", <<http://www.bomara.com/Eversys/briefDefault.htm>>, downloaded from web on Jun. 22, 2004, 4 pgs.
Product Brochure entitled: "ERS/FT II System", (© 2000) <<http://64.173.211/7/support/techinfo/system/ersft2/ersft2.htm>>, downloaded from web on Jun. 22, 2004, 4 pgs.
Product Brochure entitled: "ERS II and ERS/FT II", Chap. 3, System Components, <<http://64.173.211.7/support/techninfo/manuals/ers2/ers2–c3.htm>>, downloaded from web on Jun. 22, 2004, 21 pgs.
Windows Magazine, "Cubix PowerSMP Series 4000", Nov. 1997, <http://<www.techweb.com/winmag/library/1997/1101/ntent008.htm>> downloaded from the web on Jun. 22, 2004, pg. NT07.
MPL, "The First Rugged All–in–One Industrial 486FDX–133 MHz PC", IPM486/IPM5 User Manual, 1998, pp. 1–24.
Eversys Corp. "Eversys System 8000 Consolidated Network Server Market and Product Overview," Slide Presentation, downloaded from <<http://eversys.com>>, 20 pages total.
"SQL Server and NT Cluster Manager Availability Demo," Microsoft Server Programmer Developers Conference, Nov. 1996, 15 pages total.
Microsoft Cluster Service Center, "MSCS Basics," downloaded from <<http://www.nwnetworks.com/mscsbasics.htm>>, Feb. 7, 2005, 6 pages total.
Agerwala, T., "SP2 System Architecture", IBM Systems Journal, vol. 34, No. 2, pp. 152–184 (1995).

* cited by examiner

DATA SECURITY METHOD AND DEVICE FOR COMPUTER MODULES

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,643,777. The reissue applications are application Ser. No. 11/056,604 filed Feb. 10, 2005 (the instant application), and Ser. No. 11/545,056 filed Oct. 6, 2006, which is a continuation of the instant application.*

BACKGROUND OF THE INVENTION

The present invention relates to computing devices. More particularly, the present invention provides a method and device for securing a personal computer or set-top box. Merely by way of example, the present invention is applied to a modular computing environment for desk top computers, but it will be recognized that the invention has a much wider range of applicability. It can be applied to other portable or modular computing applications.

Many desktop or personal computers, which are commonly termed PCs, have been around and used for over ten years. The PCs often come with state-of-art microprocessors such as the Intel Pentium™ microprocessor chips. They also include a hard or fixed disk drive including memory in the giga-byte range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 19 inches in diameter. High resolution flat panel displays are also used with PCs.

Many external or peripheral devices can be used with the PCs. Among others, these peripheral devices include mass storage devices such as a Zip™ Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. The keyboard is generally configured similar to a typewriter format. The keyboard also has the length and width for easily inputting information by way of keys to the computer. The mouse also has a sufficient size and shape to easily move a cursor on the display from one location to another location.

Other types of computing devices include portable computing devices such as "laptop" computers and the like. Although somewhat successful, laptop computers have many limitations. These computing devices have expensive display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

Up to now, there has been little common ground between these platforms including the PCs and laptops in terms of upgrading, ease-of-use, cost, performance, and the like. Many differences between these platforms, probably somewhat intentional, has benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The use also wastes a significant amount of time transferring software and data between the two types of computers. For example, the user must often couple the portable computer to a local area network (i.e., LAN), to a serial port with a modem and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals that are duplicated in at least one of these computers. For example, both the desktop and portable computers typically include hard disk drives, floppy drives, CD-ROMs, computer memory, host processors, graphics accelerators, and the like. Because program software and supporting programs generally must be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use. The docking station typically includes a separate monitor, keyboard, mouse, and the like and is generally incompatible with other desktop PCs. The docking station is also generally not compatible with portable computers of other vendors. Another drawback to this approach is that the portable computer typically has lower performance and functionality than a conventional desktop PC. For example, the processor of the portable is typically much slower than processors in dedicated desktop computers, because of power consumption and heat dissipation concerns. As an example, it is noted that at the time of drafting of the present application, some top-of-the-line desktops include 400 MHz processors, whereas top-of-the-line notebook computers include 266 MHz processors.

Another drawback to the docking station approach is that the typical cost of portable computers with docking stations can approach the cost of having a separate portable computer and a separate desktop computer. Further, as noted above, because different vendors of portable computers have proprietary docking stations, computer users are held captive by their investments and must rely upon the particular computer vendor for future upgrades, support, and the like.

To date, most portable computers provide data file security through software only. A wide variety of removable storage media are available for a personal computer. These removable media do not provide any access security protection in hardware. Data encryption program often must be used for protection. Such program is cumbersome to handle for the user requiring extra cost and time. Data encryption is more commonly used for communication over an unprotected network or the Internet. Having a large number of frequently used files managed by encryption software is not practical. Without software security program, any file can be read and copied illegally from a hard disk drive on a PC or any removable media.

PC architecture generally shows freedom of data flow between memory and peripheral devices within the allowed memory and I/O address spaces. In conventional PC architecture, a peripheral bus, i.e. PCI bus, is used to control all data transactions among peripheral devices. PCI bus allows any device to be a bus master and perform data transaction with another device. Also when a software program is in control, it can move data between any two devices. There is no hardware or protocol security mechanism on a standard peripheral bus such as PCI Bus to detect or block data transactions. Operating system may have individual files read or write protected. These types of special security feature require significant additional user interaction to control. This is too cumbersome for a typical user to manage. There is no mechanism in current PCs to allow access to the primary hard disk drive and yet prevent copying of its content. The conventional PC is a single machine that does not have a mechanism to perform security ID matching in hardware.

Thus, what is needed are computer systems that provide improved security features to prevent illegal or unauthorized access to information.

SUMMARY OF THE INVENTION

According to the present invention, a technique including a method and device for securing a computer module in a computer system is provided. In an exemplary embodiment, the present invention provides a security system for an attached computer module ("ACM"). In an embodiment, the ACM inserts into a computer module bay (CMB) within a peripheral console to form a functional computer. A security program reads an identification number in a security memory device to determine a security level of the ACM according to one embodiment.

In a specific embodiment, the present invention provides a system for secured information transactions. The system has a console (e.g., computer housing) comprising a peripheral controller housed in the console; and a security memory device (e.g., flash memory device) coupled to the peripheral controller. The system also has an attached computer module (i.e., a removable module with memory and microprocessor) coupled to the console. The attached computer module has a host interface controller housed within the attached computer module to interface to the security memory device through the peripheral controller.

In an alternative embodiment, the present invention provides a security protection method for a computer module. The method includes steps or acts of inserting the computer module into a console. Once the module has been inserted, the method initiates a security program in the module to read a security identification of the console and to read a security identification of the computer module. Based upon a relationship of the console identification and the computer module identification, a predetermined security status is determined from, for example, a look up table or the like. The method then selects the predetermined security status, which can be one of many. The method then operates the computer module based upon the security status.

In a further alternative embodiment, the present invention provides a method for identifying a user for a computer module. The method includes inserting a computer module into a console; and initiating a security program in memory of the computer module. The method prompts a plurality of input fields corresponding to respective input information on a user interface to be provided by a user of the computer module. Next, the method inputs the input information into the user interface of the computer module. The input information includes a user (e.g., owner) name, a user (e.g., owner) password, a business name, a business password, and a location.

Still further, the present invention provides a system for secured information transactions, e.g., data security, electronic commerce, private communications. The system includes a console comprising a peripheral controller housed in the console. A user identification input device (e.g., keyboard, retinal reader, finger print reader, voice recognition unit) is coupled to the peripheral controller. The user identification input device is provided for user identification data of the user. The system has an attached computer module coupled to the console. The attached computer module has a security memory device (e.g., flash memory device) stored with the user identification data.

Numerous benefits are achieved using the present invention over previously existing techniques. The present invention provides mechanical and electrical security systems to prevent theft or unauthorized use of the computer system in a specific embodiment. Additionally, the present invention substantially prevents accidental removal of the ACM from the console. In some embodiments, the present invention prevents illegal or unauthorized use during transit. The present invention is also implemented using conventional technologies that can be provided in the present computer system in an easy and efficient manner. Depending upon the embodiment, one or more of these benefits can be available. These and other advantages or benefits are described throughout the present specification and are described more particularly below.

These and other embodiments of the present invention, as well as its advantages and features, are described in more detail in conjunction with the text below and attached FIGS.

DESCRIPTION OF THE SPECIFIC EMBODIMENTS

Figure 1:
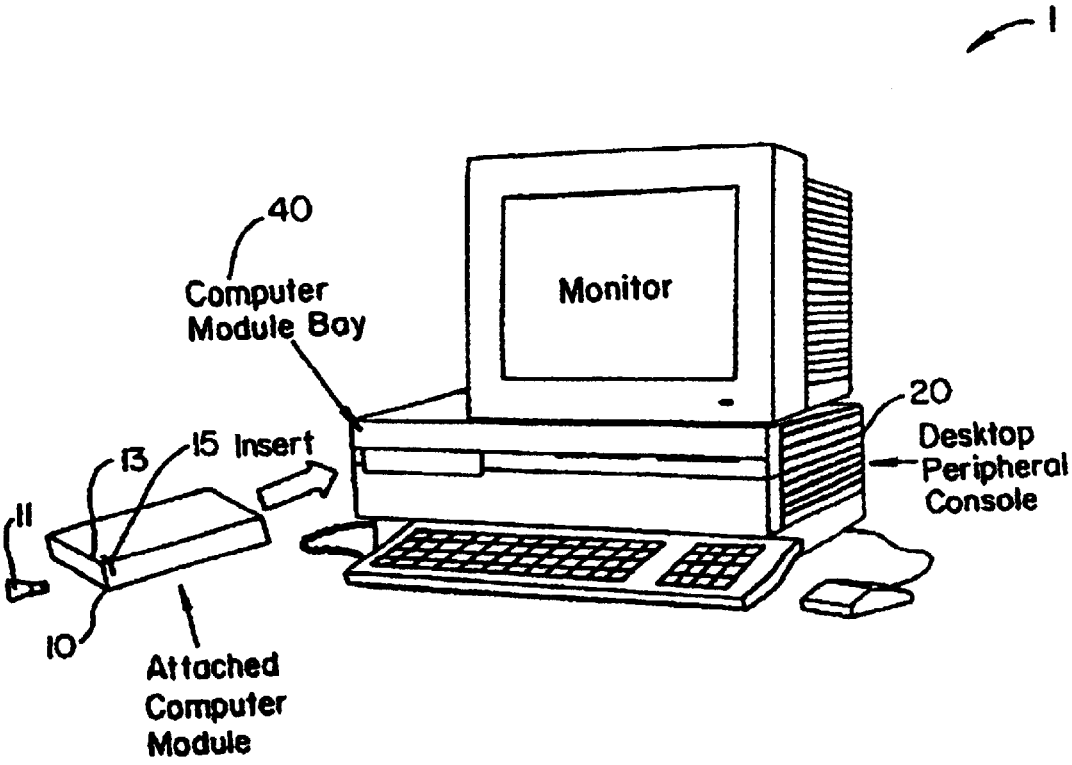
FIG. 1 is a simplified diagram of a computer system according to an embodiment of the present invention.

FIG. 1 is a simplified diagram of a computer system 1 according to an embodiment of the present invention. This diagram is merely an illustration and should not limit the scope of the claims herein. One of ordinary skill in the art would recognize other variations, modifications, and alternatives. The computer system 1 includes an attached computer module (i.e., ACM) 10, a desktop console 20, among other elements. The computer system is modular and has a variety of components that are removable. Some of these components (or modules) can be used in different computers, workstations, computerized television sets, and portable or laptop units.

In the present embodiment, ACM 10 includes computer components, as will be described below, including a central processing unit ("CPU"), IDE controller, hard disk drive, computer memory, and the like. The computer module bay (i.e., CMB) 40 is an opening or slot in the desktop console. The CMB houses the ACM and provides communication to and from the ACM. The CMB also provides mechanical protection and support to ACM 10. The CMB has a mechanical alignment mechanism for mating a portion of the ACM to the console. The CMB further has thermal heat dissipation sinks, electrical connection mechanisms, and the like. Some details of the ACM can be found in co-pending U.S. patent application Ser. Nos. 09/149,882 and 09/149,548 filed Sep. 8, 1998 commonly assigned, and hereby incorporated by reference for all purposes.

In a preferred embodiment, the present system has a security system, which includes a mechanical locking system, an electrical locking system, and others. The mechanical locking system includes at least a key 11. The key 11 mates with key hole 13 in a lock, which provides a mechanical latch 15 in a closed position. The mechanical latch, in the closed position, mates and interlocks the ACM to the computer module bay. The mechanical latch, which also has an open position, allows the ACM to be removed from the computer module bay. Further details of the mechanical locking system are shown in FIG. below.

Figure 2:
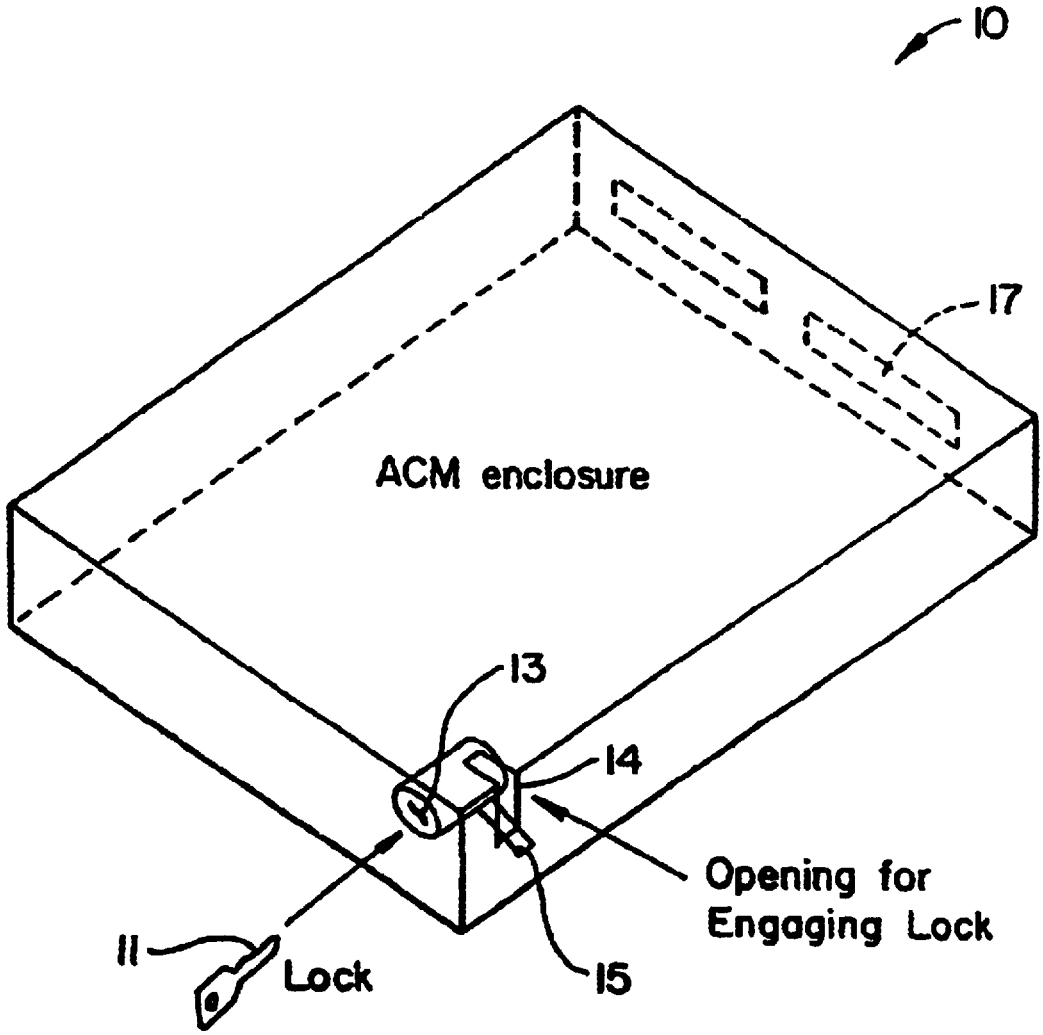
FIG. 2 is a simplified diagram of a computer module according to an embodiment of the present invention.

FIG. 2 is a simplified diagram of a computer module 10 according to an embodiment of the present invention. This diagram is merely an illustration and should not limit the scope of the claims herein. One of ordinary skill in the art would recognize other variations, modifications, and alternatives. Some of the reference numerals are similar to the previous FIG. for easy reading. The computer module 10 includes key 11, which is insertable into keyhole 13 of the lock. The lock has at least two position, including a latched or closed position and an unlatched or open position. The latched position secures the ACM to the computer module bay. The unlatched or open position allows the ACM to be inserted into or removed from the computer bay module. As shown, the ACM also has a slot or opening 14, which allows the latch to move into and out of the ACM. The ACM also has openings 17 in the backside for an electrical and/or mechanical connection to the computer module bay, which is connected to the console.

Figure 3:
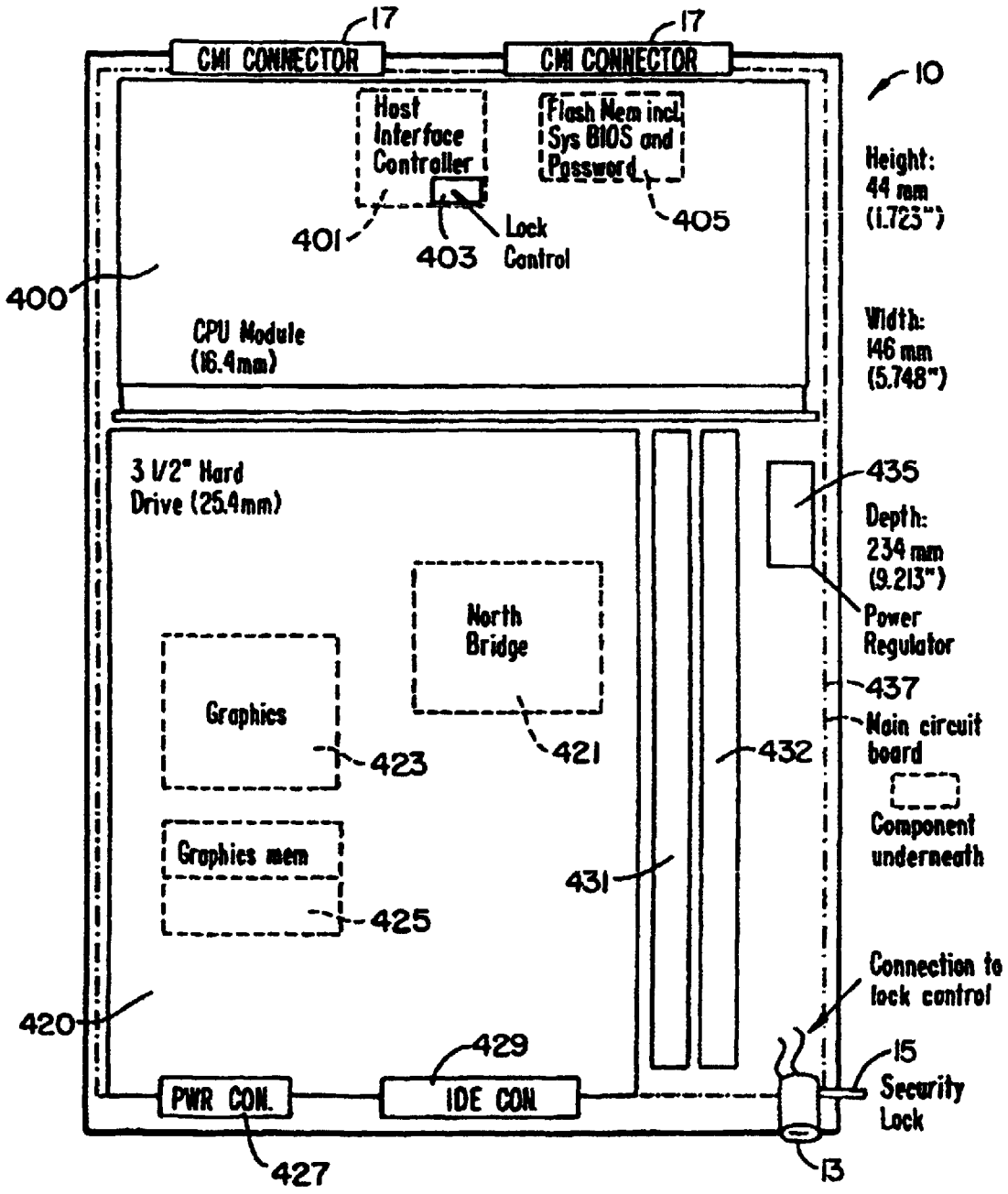
FIG. 3 is a simplified top-view diagram of a computer module according to an embodiment of the present invention.

FIG. 3 is a simplified top-view diagram 10 of a computer module for computer system according to an embodiment of the present invention. This diagram is merely an illustration and should not limit the scope of the claims herein. One of ordinary skill in the art would recognize other variations, modifications, and alternatives. The layout diagram illustrates the top-view of the module 10, where the backside components (e.g., Host Interface Controller) are depicted in dashed lines. The layout diagram has a first portion, which includes a central processing unit ("CPU") module 400, and a second portion, which includes a hard drive module 420. A common printed circuit board 437 houses these modules and the like. Among other features, the ACM includes the central processing unit module 400 with a cache memory 405, which is coupled to a north bridge unit 421, and a host interface controller 401. The host interface controller includes a lock control 403. As shown, the CPU module is disposed on a first portion of the attached computer module, and couples to connectors 17. Here, the CPU module is spatially located near connector 17.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, host interface controller 401 is coupled to BIOS/flash memory 405. Additionally, the host interface controller is coupled to a clock control logic, a configuration signal, and a peripheral bus. The present invention has a host interface controller that has lock control 403 to provide security features to the present ACM. Furthermore, the present invention uses a flash memory that includes codes to provide password protection or other electronic security methods.

The second portion of the attached computer module has the hard drive module 420. Among other elements, the hard drive module includes north bridge 421, graphics accelerator 423, graphics memory 425, a power controller 427, an IDE controller 429, and other components. Adjacent to and in parallel alignment with the hard drive module is a personal computer interface ("PCI") bus 431, 432. A power regulator 435 is disposed near the PCI bus.

In a specific embodiment, north bridge unit 421 often couples to a computer memory, to the graphics accelerator 423, to the IDE controller, and to the host interface controller via the PCI bus. Graphics accelerator 423 typically couples to a graphics memory 423, and other elements. IDE controller 429 generally supports and provides timing signals necessary for the IDE bus. In the present embodiment, the IDE controller is embodied as a 643U2 PCI-to IDE chip from CMD Technology, for example. Other types of buses than IDE are contemplated, for example EIDE, SCSI, USB, and the like in alternative embodiments of the present invention.

The hard drive module or mass storage unit 420 typically includes a computer operating system, application software program files, data files, and the like. In a specific embodiment, the computer operating system may be the Windows98 operating system from Microsoft Corporation of Redmond Washington. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 420 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 240 may also support other interfaces than IDE.

In a specific embodiment, the present invention provides a file and data protection security system and method for a removable computer module or ACM. ACM contains the primary hard disk drive (HDD) where the operating system, application programs, and data files reside. The security system is used to prevent illegal access and copying of any file residing on the HDD inside ACM. An ACM is a self-contained computing device that can be armed with security software and hardware to protect its owner's private files and data. ACM docks with a computer bay in a wide variety of peripheral consoles. The combined ACM and peripheral console function as a personal computer. A computer module interface bus connects ACM and peripheral device. In some embodiments, all ACM data passes through computer module interface (CMI) bus to reach any device in the peripheral console, i.e. floppy drive, removable media, secondary hard disk drive, modem, and others. CMI bus data transfer is controlled by a pair of interface controllers on either side of the bus. This partitioning of a personal computer offer a way of protecting against illegal access of data residing within ACM by guarding data transaction through the computer module interface bus.

In a specific embodiment, a secured ACM has an enclosure that includes the following components:

1) ACPU,
2) Main memory,
3) A primary Hard Disk Drive (HDD),
4) Operating System, application software, data files on primary HDD,
5) Interface circuitry and connectors to peripheral console,
6) Flash memory used for storing security code and ID,
7) Data detection and control circuitry to manage data flow to peripheral console,
8) Circuit board connecting the above components, and others.

A peripheral console includes some of the following elements:

1) Input means, e.g. keyboard and mouse,
2) Display means, e.g. CRT monitor, or integrated LCD display,
3) Removable storage media subsystem, e.g. Floppy drive, CDROM drive,
4) Communication device, e.g. LAN or modem,
5) Computer Module Bay, interface device and connectors to ACM,
6) Flash memory with security ID,
7) Power supply or battery system, and other devices.

The Computer Module Bay (CMB) is an opening in a peripheral console that receives ACM. CMB provides mechanical protection and electrical connection to ACM. The Computer Module Interface bus is made up of 3 bus components: video bus, peripheral data bus, and power bus. Video Bus consists of video output of graphics devices, i.e. analog RGB and control signals for monitor, or digital video signals to drive flat panel displays. Power bus supplies the power for ACM. Peripheral data bus is a high speed, compressed, peripheral bridge bus managed by a Host Interface Controller in ACM and a peripheral Interface Controller in peripheral console. In some embodiments, all peripheral data transaction passes through the interface controllers.

The implementation of the secured ACM generally includes the following elements:

1) A programmable Flash memory controlled by the Peripheral Interface Controller containing the security ID for the peripheral console,
2) A programmable Flash memory controlled by the Host Interface Controller containing hardware specific security code and ID for the computer module,
3) A data detection and control circuitry within Host Interface Controller to detect and manage data going out of ACM, and
4) A low level hardware dependent security code to perform security ID matching, hardware programming to manage data flow,
5) A high-level security program to manage user interface, program security ID, program security level, and other functions.

The hardware and software implementation allow more flexibility in the level of security protection offered to an ACM owner. Some examples of security levels are:

1) No access—Security IDs do not match according to owner's requirement. The Host Interface Controller blocks all peripheral data traffic between ACM and peripheral console except for keyboard and mouse,
2) Peripheral Read-only—No files can be written to any peripheral devices. All peripheral devices in peripheral console are managed as Read-only devices. The primary hard disk drive in ACM can be accessed freely,
3) Limited access—Certain peripheral devices are allowed read/write access, i.e. modem, and other devices are Read-only, i.e. removable media devices,
4) Full access—No restriction, and others.

Upon power up, the low level security code is executed to compare security ID between the respective flash memory between ACM and peripheral console. Typical security ID can include:

1) User ID
2) User password
3) User Access privilege
4) Business ID
5) Business password
6) Equipment ID
7) Equipment access privilege, and any other security IDs.

The user through the security program can activate different levels of password protection, which can be stored in a look up table. The company through the security program can control different levels of access privilege of a user, a business group, or equipment. The security code then program the security level allowed by the access privilege determined by the security ID matching result. For example, if an unidentified peripheral console is detected upon power up by the low level security code, e.g. a home unit, the access privilege can set to Peripheral Read-only. With Read-only access privilege for all peripheral devices in peripheral console, the data detection and control circuitry is programmed to monitor all data traffic going to the peripheral console. Any memory block transfer to peripheral console will be detected and blocked. Under this mode, a user can use the computer with free access to the primary HDD in ACM. Any files can be read from other storage media in the peripheral console. But no files from the primary HDD can be copied to another media.

The data detection circuitry separately monitors peripheral bus operation type and memory address range being accessed. A specific address range for memory accesses and for I/O accesses can be programmed for the data detection circuitry to flag a match. A data blocking circuitry is triggered by the detection circuitry when a match occurs, and blank out the data that is being sent to the peripheral console. For the security system to be effective, a [temper] *tamper* resistant enclosure must be used to prevent removal of the hard disk drive and the flash memory inside ACM. Further details are shown throughout the present specification and more particularly below.

Figure 4:
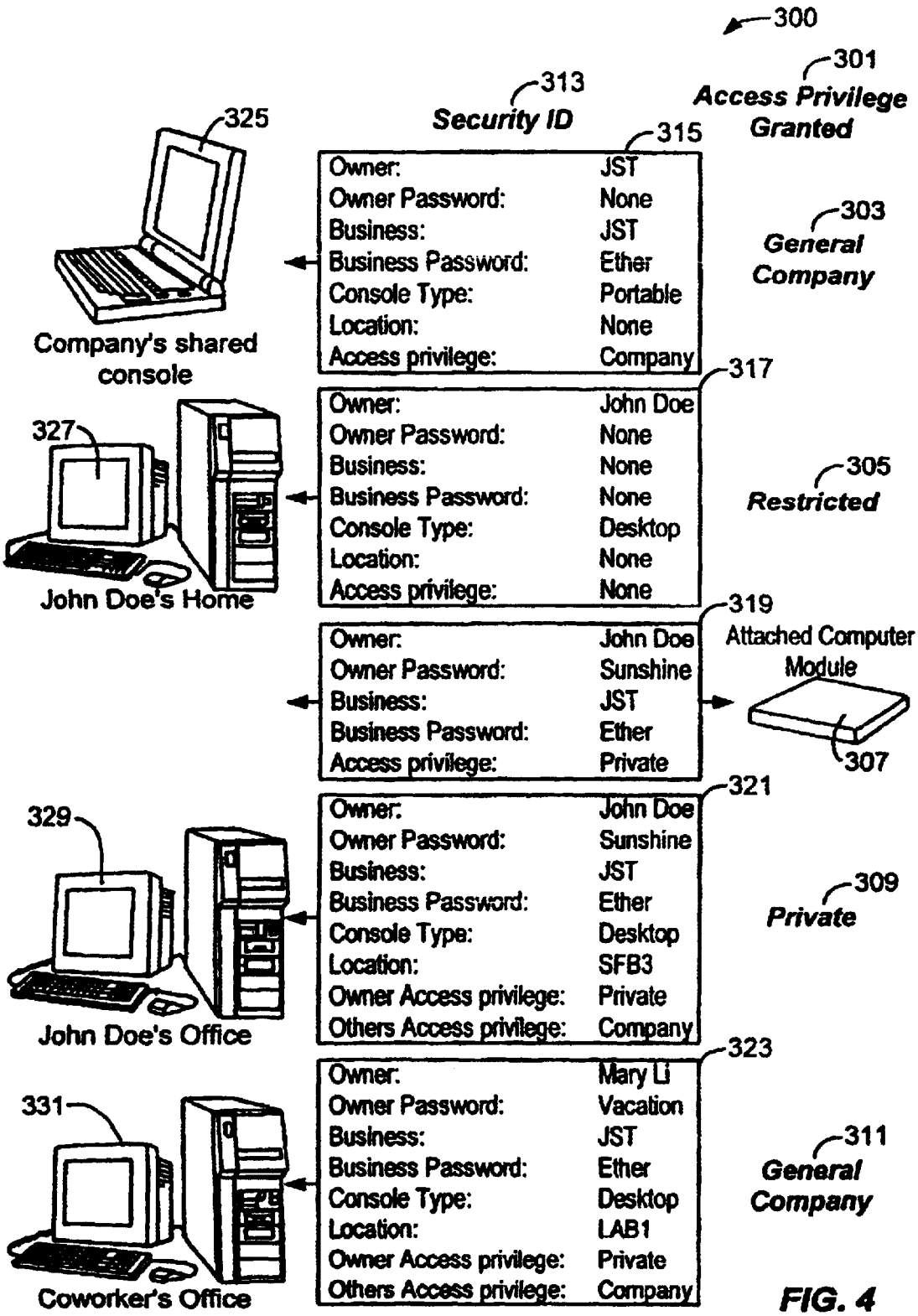
FIG. 4 is a simplified illustration of security systems according to embodiments of the present invention.

FIG. 4 is a simplified illustration of security systems 300 according to embodiments of the present invention. This illustration is merely an example, which should not limit the scope of the claims herein. One of ordinary skill in the art would recognize other variations, modifications, and alternatives. The systems show various examples of ways to implement the present invention. Here, a user relies upon certain consoles to access information. A company's shared portable console 325 can access general company information 303. Selected security identification information 315 is entered into the shared console to access the information via a network. The information generally includes owner, owner password, business, business password, console type, location, and access privilege information, which is displayed on a user display. The owner is generally the user name. Owner password is the user password. The business is the business unit name and business password is the business unit password. The console type can be portable for laptops, notebooks, and the like. Alternatively, the console type can be a desktop. The location generally specifies the desktop location or address for a networked system. Alternatively, the location can also be a home location. Access privilege can be categorized into many different levels. For example, the user can access general company information, but not information directed to other business units. The user can also be limited to access his/her private information, which is company related. Many other types of information can be restricted or accessed depending upon the embodiment.

Other types of access can be granted depending upon the consoles. For example, various consoles include, among others, a console at a user's home, e.g., "John Doe's," a console in the user's office 329, a console in a co-worker's office 331, which the user can access. The access from John Doe's home console uses security identification 317 and provides restricted access 305. The user's use of the module 307 can be from a variety of consoles and is accessed using security identification 319. Here, access privilege is private, which allows the user to access private personal information or private company information that the user has created. The user's access from his office relies upon security identification 321, which grants access to private information and general company information. The co-worker's console can also be used with security identification 323, which allows the user to access general company information but not private information of John Doe, for example. Depending upon the console used by the user, the security system can provide partial or full access to information on servers via network as well as an attached computer module. Information can also be limited to read only for certain information sources such as a server, a hard drive, a floppy drive, and others.

In a specific embodiment, the present invention also provides a security feature for the ACM 307. Here, the user of the ACM can be granted access to information in the ACM if the correct security identification information 319 is provided to the combination of ACM and console. Once the correct information is provided, the user can access the information on the hard drive of the ACM, which can be for private use. Other levels of access and security can also be provided depending upon the application.

Figure 5:
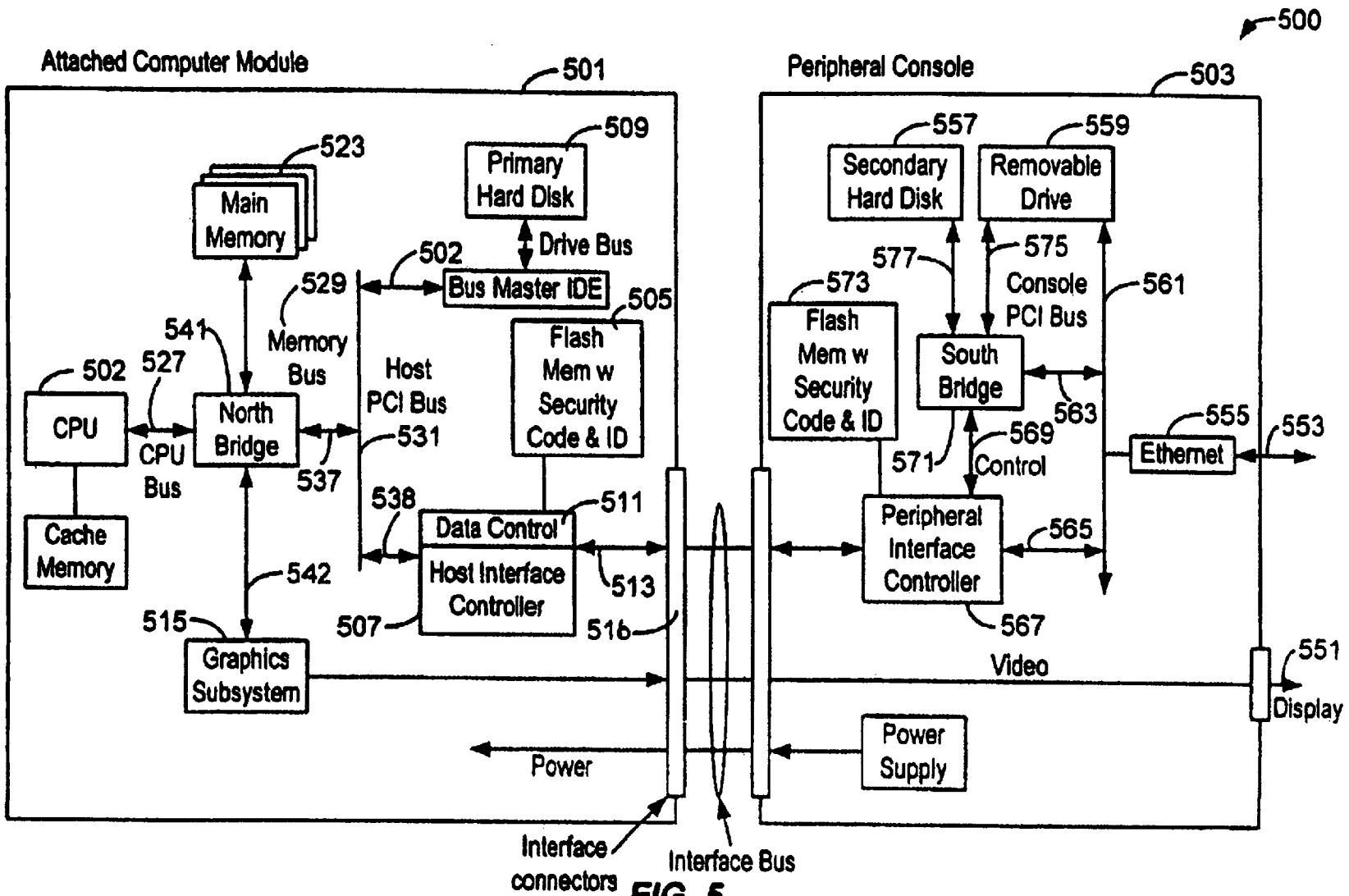
FIG. 5 is a simplified diagram of a computer module in a console according to an embodiment of the present invention.

FIG. 5 is a simplified diagram 500 of a computer module in a console according to an embodiment of the present invention. This diagram is merely an illustration which should not limit the scope of the claims herein. One of ordinary skill in the art would recognize other variations, modifications, and alternatives. The block diagram 500 includes an attached computer module 501 and a peripheral console 503, as well as other elements as desired. These elements have a variety of features such as those noted above, as well as others. In the present diagram, different reference numerals are used to show the operation of the present system.

The block diagram 500 illustrates attached computer module 501. The module 501 has a central processing unit 502, which communicates to a north bridge 541, by way of a CPU bus 527. The north bridge couples to main memory 523 via memory bus 529. The main memory can be any suitable high speed memory device or devices such as dynamic random access memory ("DRAM") integrated circuits and others. The DRAM includes at least 32 Meg. or 64 Meg. and greater of memory, but can also be less depending upon the application. Alternatively, the main memory can be coupled directly with the CPU in some embodiments. The north bridge also couples to a graphics subsystem 515 via bus 542. The graphics subsystem can include a graphics accelerator, graphics memory, and other devices. Graphics subsystem transmits a video signal to an interface connector, which couples to a display, for example.

The attached computer module also includes a primary hard disk drive 509 that serves as a main memory unit for programs and the like. The hard disk can be any suitable drive that has at least 2 GB and greater. As merely an example, the hard disk is a Marathon 2250 (2.25 GB, 2 ½ inch drive) product made by Seagate Corporation of Scotts Valley, but can be others. The hard disk communicates to the north bridge by way of a hard disk drive controller and bus lines 502 and 531. The hard disk drive controller couples to the north bridge by way of the host PCI bus 531, which connects bus 537 to the north bridge. The hard disk includes computer codes that implement a security program according to the present invention. Details of the security program are provided below.

The attached computer module also has a flash memory device 505 with a BIOS. The flash memory device 505 also has codes for a user password that can be stored in the device. The flash memory device generally permits the storage of such password without a substantial use of power, even when disconnected. As merely an example, the flash memory device has at least 512 kilobits or greater of memory, or 1 megabits or greater of memory. The flash memory device can store a security identification number or the like. The flash memory device is generally non-volatile and can preserve information even when the power is turned off, for example. The flash memory generally has at least 128 kilobits storage cells or more. The flash memory can be any product such as a W29C020 product made by a company called Winbond of Taiwan, but can also be others. The flash memory cell and user identification will be more fully described below in reference to the FIGS. A host interface controller 507 communications to the north bridge via bus 535 and host PCI bus. The host interface controller also has a data control 511. Host interface controller 507 communicates to the console using bus 513, which couples to connection [515] *516*.

Peripheral console 503 includes a variety of elements to interface to the module 501, display 551, and network 553. The console forms around south bridge 571, which couples to bus 563, which couples to bus 561. Bus 561 is in communication with network card 555, which is a local area network for Ethernet, for example. South bridge also couples through control 569 to peripheral interface controller 567, which also communicates to bus 561. Peripheral interface controller also couples to host interface controller through connection [515] *516* and bus 513. The peripheral console has a primary removable drive 559 connected to south bridge through bus 575. South bridge also couples to secondary hard disk through bus 577.

In a specific embodiment, the peripheral console also has a serial EEPROM memory device 575, which is coupled to the peripheral interface controller. The memory device can store a security identification number or the like. The memory device is generally non-volatile and can preserve information even when the power is turned off, for example. The memory generally has at least 16 kilobits of storage cells or more. Preferably, the memory device is a 16 kilobit device or 64 megabit device or greater, depending upon the application. The memory can be any product such as a X24320 product made by a company called Xicor, but can also be others. The memory cell and user identification will be more fully described below in reference to the FIGS.

Figure 6:
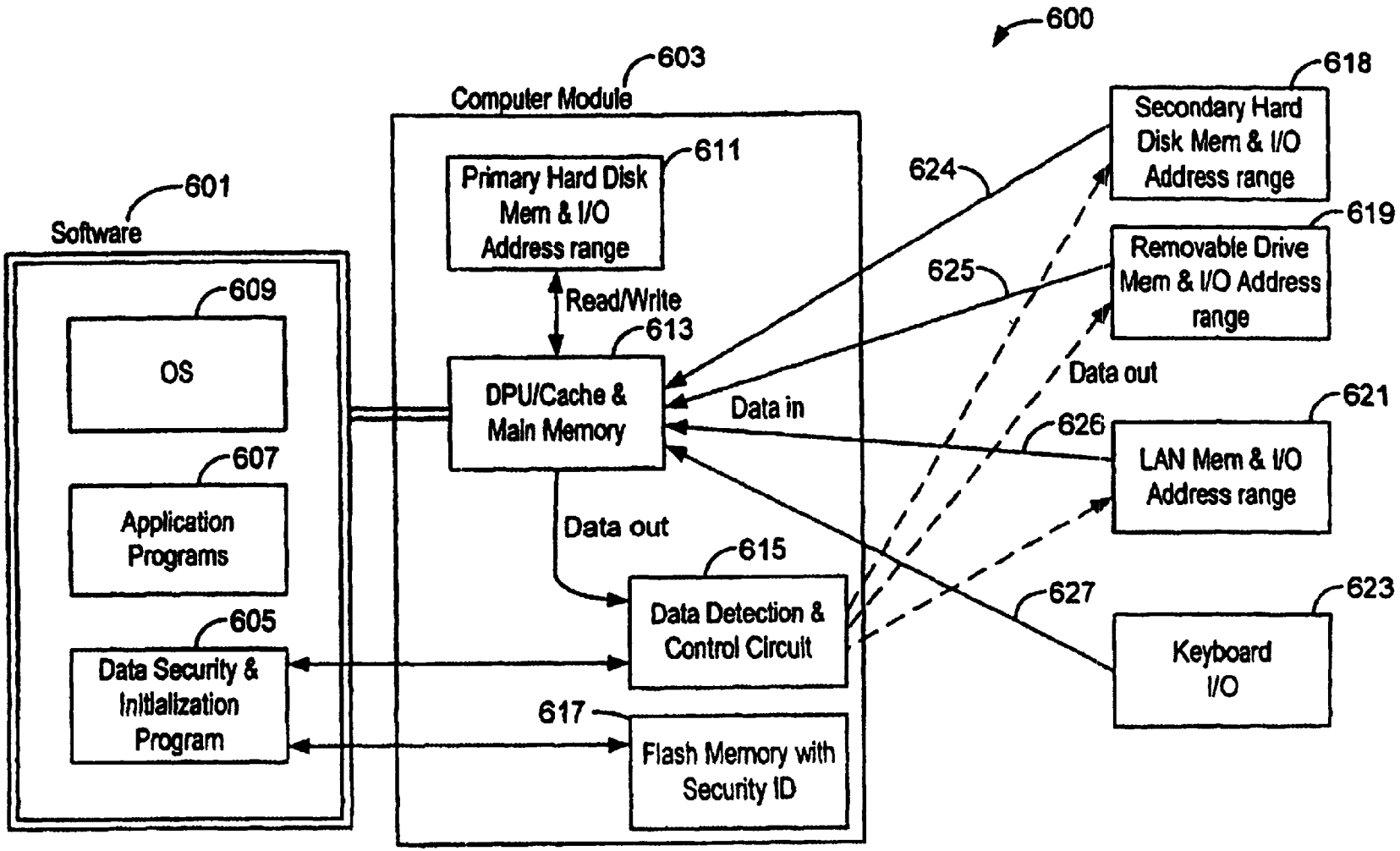
FIG. 6 is a simplified diagram of a security method for a module according to an embodiment of the present invention.

FIG. 6 is a simplified diagram of a security method 600 for a module according to an embodiment of the present invention. This diagram is merely an illustration which should not limit the scope of the claims herein. One of ordinary skill in the art would recognize other variations, modifications, and alternatives. The present method shows an example of how the present security method can be implemented. The present method uses a combination of software 601 and hardware 603, which is in the computer module. A plurality of external devices can be accessed depending upon the embodiment. These external devices include a secondary hard drive 618, a removable drive 619, a network (e.g., LAN, modem) device 621, and others. A keyboard 623 is also shown, which can act locally.

The software 601 includes an operating system 609, application programs 607, and a data security and initialization program 605. Other programs can also exist. Additionally, some of these programs may not exist. Preferably, the data security and initialization program exists. This data security and initialization program is initiated once the attached computer module is inserted into the console. The program interface and oversees a variety of hardware features, which will be used to control access to the external devices, for example. Of course, the particular configuration of the software will depend upon the application.

Hardware features can be implemented using a primary hard disk 611 coupled to a CPU/cache combination, which includes a main memory. The main memory is often a volatile memory such as dynamic random access memory. Data from any one of the external devices can enter the CPU/cache combination. For example, the secondary hard disk memory and I/O address range data is transferred 624 to the CPU/cache combination. The removable drive memory and I/O address range data can also transfer 625 to the CPU/cache combination. The LAN memory and I/O address range data can also transfer 626 to the CPU/cache combination. Keyboard data can also transfer 627 to the CPU/cache combination. To write data from the module into any one of these external elements, the data security program interfaces with the data detection and control circuit to determine of such data should be transferred to any one of the external elements. As noted, the external elements include, among others, secondary hard disk, and removable drive. Here, the data security program checks the security identification number with other numbers to determine the security access level. There are many other ways that the present invention can be implemented. These methods are described more fully below.

Figure 7:
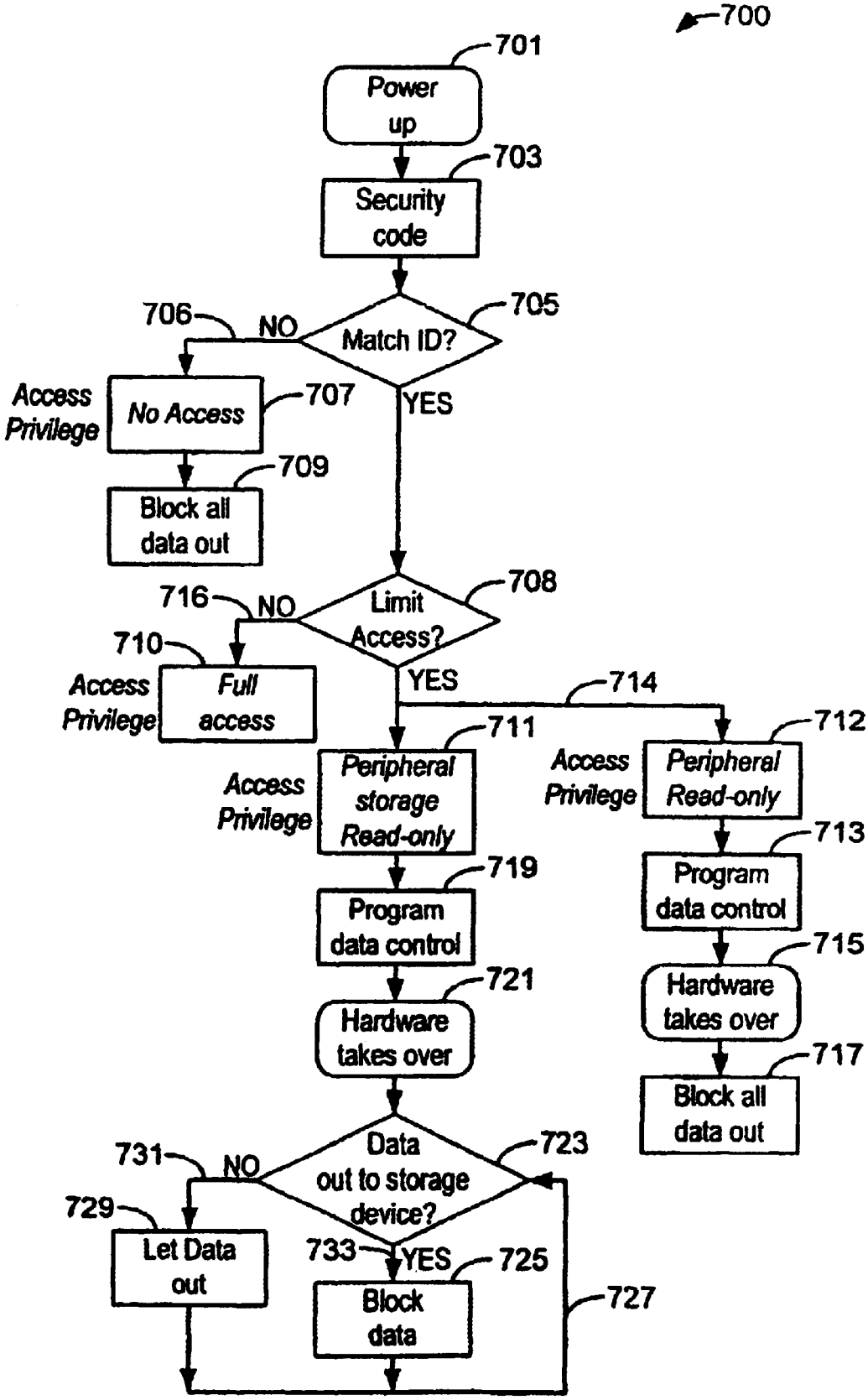
FIG. 7 is a simplified diagram of a method according to an embodiment of the present invention.

FIG. 7 is a simplified diagram 700 of a method according to an embodiment of the present invention. This diagram is merely an illustration which should not limit the scope of the claims herein. One of ordinary skill in the art would recognize other variations, modifications, and alternatives. The present method begins at power up, which is step 701. The present method reads a security code, which has been entered by a user, for example, in step 703. The security code can be a string of characters, including numbers and letters. The security code is preferably a mixture of numbers and letters, which are at least about 6 characters in length, but is not limited.

The present method reads (step 703) the security code, which has been entered. Next, the security code is compared with a stored code, which is in flash memory or the like (step 705). If the compared code matches with the stored code, the method resumes to step 708. Alternatively, the method goes to step 707 via branch 706 where no access is granted. When no access is granted, all data are blocked out from the user that attempts to log onto the system. Alternatively, the method determines if a certain level of access is granted, step 708. Depending upon the embodiment, the present method can grant full access, step 710, via branch 716. The present method allows full access based upon information stored in the flash memory device. Alternatively, the method can allow the user to access a limited amount of information.

Here, the present method allows for at least one or more than two levels of access. In a specific embodiment, the present method allows for the user of the module to access peripheral storage (step 711). The access privilege is read-only. The user can read information on the peripheral storage including hard disks and the like. Once the user accesses the storage, the method data control, step 719, takes over, where the hardware prevents the user from accessing other information, step 721. In a specific embodiment, the method can allow information to be removed from the peripheral storage. If the method allows for data to be removed, step 723, the method goes through branch 731 to let data out, which can occur through the module. Alternatively, the method goes to block data (step 725) via branch 733. Depending upon the embodiment, the method returns to the decision block, step 723. Alternatively, the method traverses branch 714 to a peripheral read-only process, step 712. The read-only process programs data control, step 713. Next, the hardware takes over (step 715). The method blocks all data from being accessed by the user, step 717.

Figure 8:
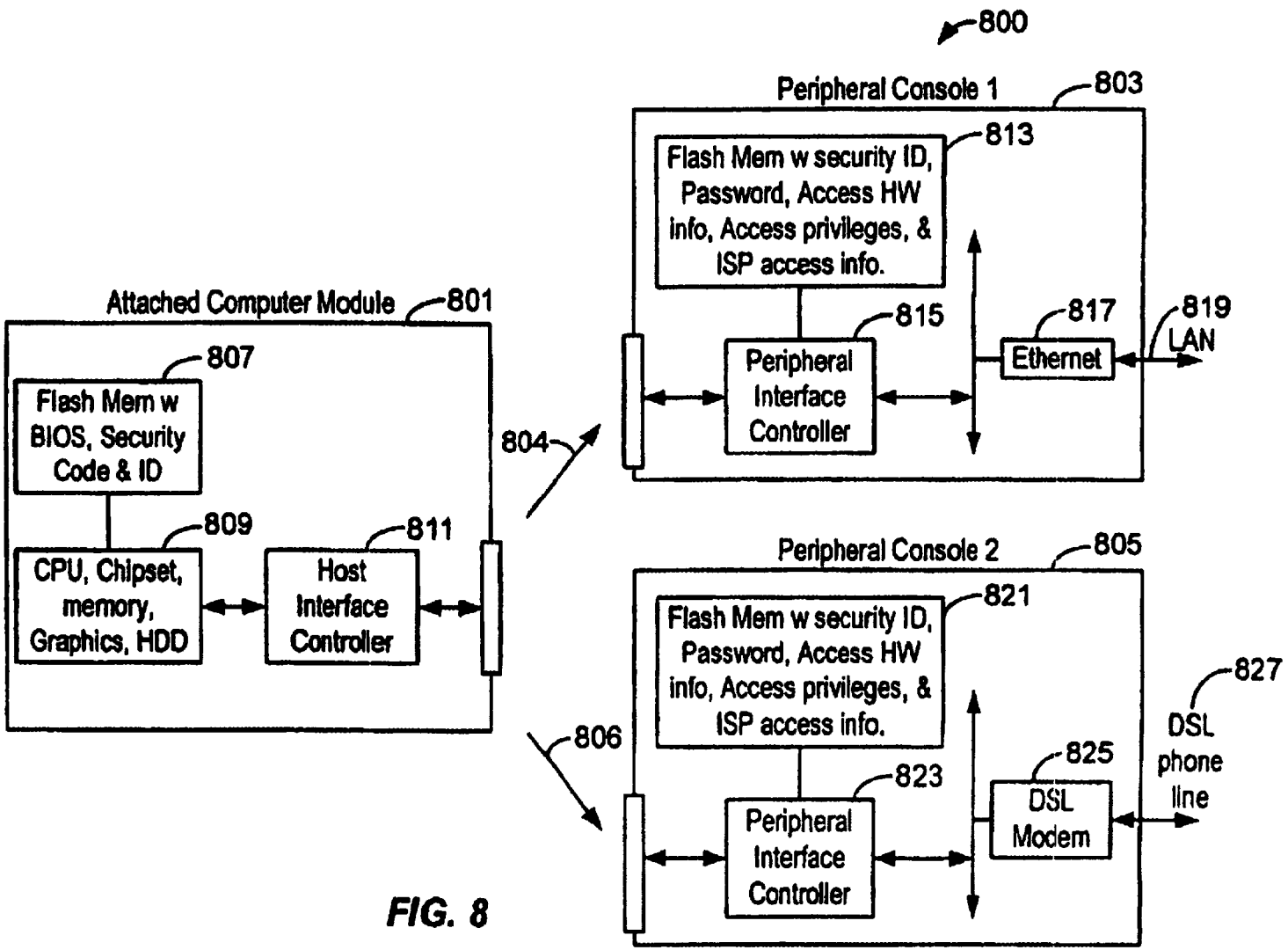
FIG. 8 is a simplified diagram of a system 800 according to an alternative embodiment of the present application.

FIG. 8 is a simplified diagram of a system 800 according to an alternative embodiment of the present invention. This diagram is merely an example which should not limit the scope of the claims herein. One of ordinary skill in the art would recognize many other variations, modifications, and alternatives. The system 800 includes an attached computer module 801, which can be inserted into one of a plurality of console devices to create a "plug and play" operation. For example, the console device can be peripheral console 801 or peripheral console 805. Each peripheral console can have similar or different connection characteristics. Peripheral console 803 couples to a local area network using Ethernet 817. Peripheral console 805 couples to a DSL line 827 through a DSL modem 825. Other consoles can also be included to use other types of networks such as ADSL, Cable Modem, wireless, Token Ring, and the like.

As shown, the attached computer module has elements such as a memory region 807, which stores BIOS information, a security code, and a security identification number on a flash memory device or the like. The memory region couples to a central processing region 809, which can include CPU, chipset, cache memory, graphics, and a hard disk drive, as well as other features. The central processing region couples to a host interface controller, which interfaces the attached computer module to one of the peripheral consoles. Any of the above information can also be included in the attached computer module.

Each peripheral console also has a variety of elements. These elements include a region 813, 821, which has a flash memory device with a security identification number, a password, access information, access privileges, internet service provider access information, as well as other features, which were previously noted. The peripheral console also has an interface controller 815, 823, which couples region 813, 821, respectively to a networking device 817, 825. The networking device can be an Ethernet card 817, which allows communication to the local area network 819. Alternatively, the networking device can be a DSL modem 825, which allows communication to a DSL (or ADSL) phone line. Other types of networking device can also be used, depending upon the application.

Each console provides a selected connection based upon set of predefined factors. These factors include communication hardware information so that software in attached computer module can read and allow a connection to a network. Here, access information can be provided to the user. Information about connection information will also be included. This connection information includes telephone numbers, account numbers, passwords (local), or a company password. The console and module combination will take care of charges, etc. based upon time bases. Module will have credit card information, but will have security. In a specific embodiment, the module inserts into the console. The module then asks the console which hardware will be used. If the hardware is an Ethernet connect, the module configures connection information to access the Ethernet connection. Alternatively, if the hardware requires a DSL connection, the module configures connection information to access the DSL connection. Other configuration information such as company server information, password, can also be provided.

Although the functionality above has been generally described in terms of a specific sequence of steps, other steps can also be used. Here, the steps can be implemented in a combination of hardware, firmware, and software. Either of these can be further combined or even separated. Depending upon the embodiment, the functionality can be implemented in a number of different ways without departing from the spirit and scope of the claims herein. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A security protection method for a computer module, said method comprising:

inserting the computer module into a console;

initiating a security program in said module to read a security identification of said console and to read a security identification of said computer module, *wherein said step of initiating reads said security identification of said computer module from a flash memory device*;

determining of a predetermined security status based upon a relationship of said console identification and said computer module identification;

selecting said predetermined security status; and operating said computer module based upon said security status.

2. The method of claim 1 wherein said predetermined security status disables a network access to the computer module.

3. The method of claim 1 wherein said predetermined security status disables a secondary storage of information from said computer module to substantially prevent information to be transferred from a memory of the computer module to said secondary storage.

4. The method of claim 1 wherein said security program is provided in a system BIOS.

[5. The method of claim 1 wherein said step of initiating reads said security identification of said computer module from a flash memory device.]

6. The method of claim 1 wherein said step of initiating reads said security identification of said console from a flash memory device.

7. The method of claim 1 wherein said console is selected from a desktop home computing device, an office desktop computing device, a mobile computing device, a television sot-top computing device, and a co-worker's computing device.

8. A system for secured information transactions, the system comprising:

a console comprising a peripheral controller housed in the console;

a user identification input device coupled to the peripheral controller, the user identification input device being provided for user identification data, *wherein the user identification input device is a finger print reader*; and an attached computer module coupled to the console, the attached computer module comprising a security memory device stored with the user identification data.

[9. The system of claim 8 wherein the user identification input device is a finger print reader.]

10. [The system of claim 8] *A system for secured information transactions, the system comprising:*

*a console comprising a peripheral controller housed in the console;*

*a user identification input device coupled to the peripheral controller, the user identification input device being provided for user identification data,* wherein the user identification input device is a voice processing device*; and*

*an attached computer module coupled to the console, the attached computer module comprising a security memory device stored with the user identification data.*

[11. A method for operating a module computer into one of a plurality of network systems, the method comprising:

providing a computer module, the module comprising a connection program;

inserting the computer module into a computer console, the computer console having access to a network;

receiving connection information from the computer console;

configuring the connection program to adapt to the connection information; and establish a connection between the computer module and a server coupled to the network.]

[12. The method of claim 11 wherein the connection information comprises a connection protocol for providing the connection.]

[13. The method of claim 12 wherein the connection protocol is selected from TCP/IP, or mobile IP.]

*14. A security protection method for a computer module, said method comprising:*

*inserting the computer module into a console;*

*initiating a security program in said module to read a security identification of said console and to read a security identification of said computer module, wherein initiating reads said security identification from a flash memory device;*

*determining of a security status based upon a relationship of said console identification and said computer module identification;*

*selecting said security status; and*

*operating said computer module based upon said security status.*

*15. A system for secured information transactions, the system comprising:*

*a console comprising a network communication controller housed in the console;*

*a user identification input device coupled to the console, the user identification input device being provided for user identification data; and*

*an attached computer module coupled to the console, the attached computer module comprising a mass storage unit, a graphics subsystem, an interface controller coupled to the console, and a security memory device stored with the user identification data, wherein the security memory device comprises a flash memory, and wherein all data from the computer module passes through the interface controller to reach any device in the console.*

*16. The system of claim 15 wherein said security memory device is further stored with a security program, wherein said security program can at least one of activate different levels of password protection, and control different levels of access privilege.*

*17. The system of claim 15 wherein the flash memory device includes codes to provide password protection.*

*18. A system for secured information transactions, the system comprising:*

*a console comprising a network communication controller housed in the console;*

*a user identification input device coupled to the console, the user identification input device being provided for user identification data; and*

*an attached computer module coupled to the console, the attached computer module comprising a mass storage unit comprising a hard disk drive including a computer code for implementing a security program, a graphics subsystem, and a security memory device stored with the user identification data.*

*19. The system of claim 18 wherein the security memory device comprises flash memory includes a code to provide password protection.*

*20. The system of claim 18 wherein said security program can at least one of activate different levels of password protection, and control different levels of access privilege.*

*21. A modular system for information transactions, the system comprising:*

*a console comprising a first interface controller housed in the console and coupled with an interface connector; and*

*an attached computer module coupled to the console through the interface connector and comprising a mass storage unit, a graphics subsystem, a security program, and a second interface controller coupled to the first interface controller, wherein the computer module further comprises a security memory device stored with security identification data, wherein the security memory device comprises a flash memory including a code to provide password protection, and wherein all data transferred from the mass storage unit to the console passes through the first and second interface controllers.*

*22. The system of claim 21 wherein the attached computer module further comprises a tamper resistant enclosure.*

*23. The system of claim 21 wherein the attached computer module can be inserted into the console to create a "plug and play" operation.*

*24. The system of claim 21 wherein the attached computer module further comprises a microcontroller.*

*25. A modular system for secured information transactions, the system comprising:*

*a computer console comprising a first interface controller housed in the console and coupled to an interface connector;*

*a user identification input device coupled to the console, the user identification input device being provided for user identification data; and*

*an attached computer module coupled to the console, the attached computer module comprising a security program providing password protection, a mass storage unit comprising a flash memory device, a graphics subsystem, and a second interface controller coupled to the first interface controller, wherein the user identification data passes to the computer module through first and second interface controllers.*

*26. The system of claim 25 wherein the attached computer module further comprises a central processing unit and a graphics subsystem.*

*27. A system for secured information transactions, the system comprising:*

*a computer console comprising a network communication controller housed in the console;*

*a user identification input device coupled to the console, the user identification input device being provided for user identification data; and*

*an attached computer module coupled to the console, the attached computer module comprising a central processing unit, a graphics subsystem, an interface controller coupled to the console, and a security memory device stored with the user identification data, wherein the security memory device comprises a flash memory including codes to provide password protection.*

*28. The system of claim 27 wherein said attached computer module inserts into a bay of the console to form a functional computer.*

*29. The system of claim 27 wherein the attached computer module can be inserted into the console to create a "plug and play" operation.*

*30. A system for information transactions, the system comprising:*

*a computer console comprising a network communication controller housed in the console; and*

*an attached computer module coupled to the console, the attached computer module comprising a central processing unit, a graphics subsystem, a security program configured to at least one of activate different levels of password protection and control different levels of access privilege, and an interface controller coupled to the console, wherein all computer module network data passes through the console.*

*31. The system of claim 30 wherein the console further comprises a user identification input device coupled to the console, the user identification input device being provided for user identification data, wherein the user identification data passes from the console through said interface controller to the attached computer module.*

*32. A security protection method for a computer module comprising a mass storage unit and a graphics subsystem, said method comprising:*

*inserting the computer module into a console comprising a network communication controller;*

*storing security information data with a security memory device of the computer module, by storing codes in a flash memory to provide password protection for said attached computer module;*

*initiating a security program in said module to read a security identification of said console and to read a security identification of said computer module;*

*determining of a predetermined security status based upon a relationship of said console identification and said computer module identification;*

*selecting said predetermined security status; and*

*operating said computer module based upon said security status.*

*33. The method of claim 32 wherein a user identification input device coupled to the console provides user security identification information to the console.*

*34. A method for operating a module computer into one of a plurality of network systems, the method comprising:*

*providing an attached computer module, the module comprising a connection program, an interface controller and a security identification;*

*storing security identification data in a security memory device of the computer module;*

*coupling the computer module to a computer console through the interface controller, the computer console comprising a network communication device having access to a network;*

*receiving connection information from the console through the interface controller;*

*receiving the security identification through the interface controller;*

*transmitting video information to the console from a graphics subsystem of the attached computer module;*

*configuring the connection program to adapt to the connection information.*

*35. The method of claim 34 wherein the attached computer module further comprises of a micro-controller coupled to the interface controller.*

*36. The method of claim 34 wherein the attached computer module further comprises a hard disk drive containing a security program.*

*37. A method for operating a module computer into one of a plurality of network systems, the method comprising:*

*providing an attached computer module, the module comprising a connection program, a graphics subsystem, an interface controller and a security memory device stored with the user identification data;*

*coupling the computer module to a computer console through the interface controller, the computer console comprising a network communication device having access to a network;*

*receiving connection information from the console through the interface controller;*

*receiving the user identification data through the interface controller;*

*configuring the connection program to adapt to the connection information, and establishing console access to the computer module, wherein all network data transaction of the attached computer module passes through the console.*

*38. The method of claim 37 further comprising providing password protection for said computer module from a security program stored on a hard disk drive of the computer module.*

*39. The method of claim 37 further comprising providing password protection for said computer module from codes stored in a flash memory of the computer module.*

*40. The method of claim 37 further comprising providing to the network with security, credit card information stored in the attached computer module.*

*41. A method for operating a module computer into one of a plurality of network systems, the method comprising:*

*providing an attached computer module, the module comprising a connection program and an interface controller;*

*storing security information in a flash memory device of the computer module;*

*inserting the computer module into a computer console to form a functional computer to create a "plug and play" operation, the computer console comprising a second interface controller coupled to the first interface controller upon insertion, and the console having access to an external network;*

*receiving connection information from the console through the interface controller;*

*configuring the connection program to adapt to the connection information, and establishing the computer module connection to the external network through said interface controllers.*

*42. The method of claim 41 further comprising providing password protection to the computer module from codes stored in a flash memory device of the computer module.*

*43. The method of claim 41 further comprising providing to the network with security, credit card information from the computer module.*

*44. A method for operating a module computer into one of a plurality of network systems, the method comprising:*

*providing an attached computer module, the module comprising a connection program and an interface controller;*

*inserting the computer module into a computer console to form a functional computer to create a "plug and play" operation, the computer console comprising a second interface controller coupled to the first interface controller upon insertion, and the console having access to an external network;*

*receiving connection information from the console through the interface controller;*

*configuring the connection program to adapt to the connection information, and establishing the computer module connection to the external network through said interface controllers, the method further comprising providing password protection for said computer module from a security program on a hard disk drive of the computer module.*

*45. A method for operating a module computer into one of a plurality of network systems, the method comprising:*

*providing an attached computer module, the module comprising an enclosure, a graphics subsystem, a connection program and a first interface controller;*

*coupling the computer module to a computer console, the computer console comprising a second interface controller coupled to the first interface controller upon insertion, and the console having access to an external network;*

*receiving connection information from the console through the interface controllers;*

*configuring the connection program to adapt to the connection information, and establishing the computer module access to the external network, the method further comprising providing password protection for said computer module from codes stored in a flash memory device of the computer module.*

*46. The method of claim 45 wherein providing the attached computer module further comprises:*

*inserting the computer module into the console to create a "plug and play" operation, and*

*powering on the computer module by the console.*

*47. A method for operating a module computer into one of a plurality of network systems, the method comprising:*

*providing an attached computer module, the module comprising an enclosure, a graphics subsystem, a connection program and a first interface controller;*

*coupling the computer module to a computer console, the computer console comprising a second interface controller coupled to the first interface controller upon insertion, and the console having access to an external network;*

*providing password protection for said computer module from codes stored in a flash memory device of the computer module;*

*receiving connection information from the console through the interface controllers;*

*configuring the connection program to adapt to the connection information, and establishing the computer module access to the external network, the method further comprising providing password protection for said computer module from a security program of a hard disk drive of said computer module.*

*48. The method of claim 45 further comprising providing with security the external network, credit card information of the attached computer module.*

*49. A method for operating a modular computer into a network, the method comprising:*

*providing a computer module, the module comprising a central processing unit, a graphics subsystem and a connection program;*

*inserting the computer module into a computer console to create a "plug and play" operation, the computer console comprising a network communication controller having access to an external network;*

*receiving connection information from the computer console;*

*configuring the connection program to adapt to the connection information; and establishing a connection between the computer module and a server coupled to the network in the plug and play operation, the method further comprising providing password protection for said computer module from codes stored in a flash memory device of the computer module.*

*50. The method of claim 49 wherein the computer module further comprising:*

*managing a user interface with a high-level security program; and*

*accessing data content of the computer module utilizing a program security ID.*

*51. The method of claim 49 wherein the computer module further comprises security identification, the method further comprising*

*providing the security identification to the security program,*

*determining a predetermined security status, and controlling different levels of access privilege to said attached computer module.*

*52. A system for secured information transactions, the system comprising:*

*a console comprising a network communication controller housed in the console and coupled to an external network;*

*a user identification input device coupled to the console, the user identification input device being provided for user identification data; and*

*an attached computer module coupled to the console, the attached computer module comprising a central processing unit, a graphics subsystem, and a mass storage unit storing a security program and a user identification datum,*

*wherein the security program is configured to receive the user identification datum from the input device, match the stored user identification data, and permit external access to the computer module, and*

*wherein the security program is further configured to at least one of activate different levels of password protection, and control different levels of access privilege.*

*53. The system of claim 52 wherein the console further comprises a Read-only removable storage medium.*

*54. A system for secured information transactions, the system comprising:*

*a console comprising a network communication controller housed in the console and coupled to an external network;*

*a user identification input device coupled to the console, the user identification input device being provided for user identification data; and*

*an attached computer module coupled to the console, the attached computer module comprising a central processing unit, a graphics subsystem, an interface controller coupled to the console, and a mass storage unit storing a security program and a user identification data, wherein the attached computer module further comprises a flash memory device including codes for password protection,*

*wherein the security program receives the user identification data from the input device, matches the stored user identification data and permits external data transfer to the computer module through the interface controller.*

*55. The system of claim 54 wherein all peripheral data transaction of the attached computer module passes through said interface controller.*

*56. A system for secured information transactions, the system comprising:*

*a computer console comprising a first interface controller housed in the console, and a LAN communication controller;*

*a user identification input device coupled to the console, the user identification input device being provided for user identification data; and*

*an attached computer module coupled to the console through the interface controller, the attached computer module comprising a second interface controller*

*couples to the first interface controller, a CPU, a graphics subsystem, and a mass storage unit stored with the user identification data, the mass storage unit comprising a flash memory device including codes to provide password protection, wherein all LAN communication of the computer module passes through the console.*

*57. The system of claim 56 wherein the attached computer module can be inserted into the console to create a "plug and play" operation.*

*58. The system of claim 56 wherein the attached computer module further comprises a tamper resistant enclosure.*

*59. A system for secured information transactions, the system comprising:*

*a computer console comprising an interface controller housed in the console, and a LAN communication controller;*

*a user identification input device coupled to the console, the user identification input device being provided for user identification data; and*

*an attached computer module coupled to the console through the interface controller, the attached computer module comprising a graphics subsystem, a CPU module and a mass storage unit, wherein all network data transaction of the computer module passes through the console, and wherein the mass storage unit comprises a hard disk drive containing a security program to provide password protection of said computer module.*

*60. A method for operating an attached computer module, the method comprising:*

*providing an attached computer module, the module comprising a security program, a user password, a first interface controller coupled to an interface connector;*

*coupling the computer module to a computer console, the computer console comprising a second interface controller compatible to the first interface controller, and a LAN communication controller coupled to an external network;*

*establishing communication between the two interface controllers;*

*receiving the user password from the console;*

*activating the security program to match the user password; and establishing the console access to the computer module, the method further comprising providing password protection for said computer module from codes contained in a flash memory device of the computer module.*

*61. The method of claim 60 wherein the attached computer module receives power from the console to form a functional computer.*

*62. The method of claim 60 wherein all data transaction of the attached computer module passes through said interface controllers.*

* * * * *